United States Patent [19]

Yano et al.

[11] Patent Number: 5,074,591

[45] Date of Patent: Dec. 24, 1991

[54] POSITION ADJUSTING DEVICE FOR A SHOULDER BELT OF A SEAT BELT ASSEMBLY

[75] Inventors: Hideaki Yano; Hideo Kitamura, both of Shiga, Japan

[73] Assignee: Takata Corporation, Tokyo, Japan

[21] Appl. No.: 604,633

[22] Filed: Oct. 29, 1990

[30] Foreign Application Priority Data

Nov. 16, 1989 [JP] Japan .................. 1-297975

[51] Int. Cl.⁵ .................................. B60R 21/10
[52] U.S. Cl. ............................ 280/808; 297/483; 297/486
[58] Field of Search ............... 280/801, 802, 804, 808; 297/473, 483, 486

[56] References Cited

U.S. PATENT DOCUMENTS

| | | | |
|---|---|---|---|
| 4,547,717 | 10/1985 | Radermacher et al. | 280/808 |
| 4,706,993 | 11/1987 | Tamura | 280/808 |
| 4,765,651 | 8/1988 | Unger | 280/808 |
| 4,801,156 | 1/1989 | Escaravage | 280/808 |
| 4,892,331 | 1/1990 | Wollner et al. | 280/808 |
| 4,895,392 | 1/1990 | Schut et al. | 280/808 |

*Primary Examiner*—Kenneth R. Rice
*Attorney, Agent, or Firm*—Kanesaka and Takeuchi

[57] ABSTRACT

A position adjusting device for a shoulder belt in a seat belt assembly comprises a belt anchor into which the shoulder belt is loosely passed, an anchor support block supporting the belt anchor, a guide rail slidably holding the anchor support block, and a straight screw shaft which is arranged along a longitudinal direction of the guide rail and is screwed into the anchor support member, so that the anchor support block may be moved along the guide rail by the rotation of the screw shaft; the anchor supporting block having two female screw members screwed around the screw shaft, and is biased by an elastic member toward or away from each other.

6 Claims, 8 Drawing Sheets

POSITION ADJUSTING DEVICE FOR A SHOULDER BELT OF A SEAT BELT ASSEMBLY

FIELD OF THE INVENTION AND RELATED ART STATEMENT

The present invention relates a seat belt assembly for protecting and restraining a person on a seat in an automobile or the like, and more particularly to a position adjusting device for a shoulder belt of the seat belt assembly. Specifically, the present invention relates to a position adjusting device improved to reduce an operating noise during a position adjusting operation.

Generally, automobiles or the like are provided with seat belts for restraining and protecting persons on the seats in emergency such as collision.

In order to restrain a body of the person by the seat belt, a portion thereof for restraining the body should have a high strength so as to bear an instantaneously generated load corresponding to tens times as large as the weight of the body. Therefore, it is usually preferable to ensure that a lap belt rests on a hipbone and a shoulder belt rests on an intermediate between a shoulder joint and a neck.

However, the seat belt is used to restrain person of various sizes, i.e., both the children and adults, and further the seat are adjusted to various positions in accordance the respective person.

In consideration of these problems, a position adjusting device for a shoulder belt of a seat belt assembly has been proposed, in which a position of a belt anchor of the shoulder belt can be adjusted to obtain a restraint condition preferable for each person.

Figure 6A:
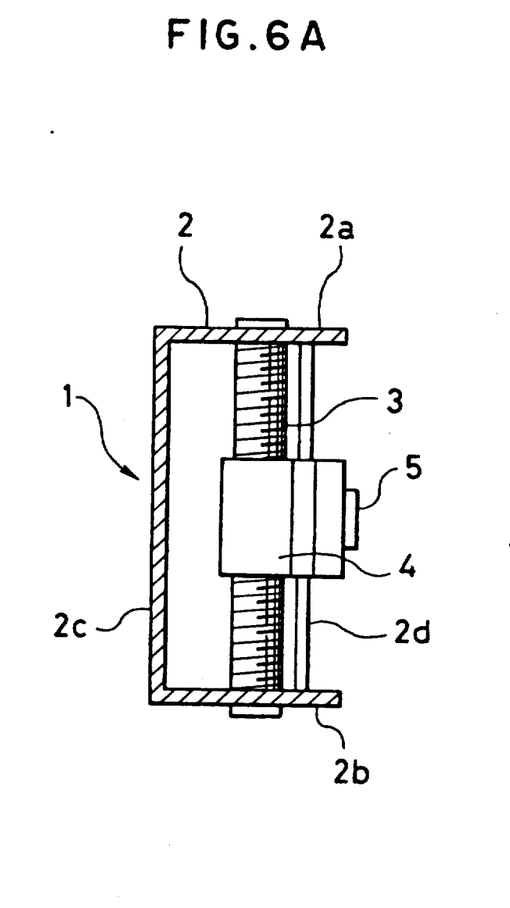
FIG. 6A is a front view of a conventional position adjusting device for a shoulder belt of a seat belt assembly.
Figure 6B:
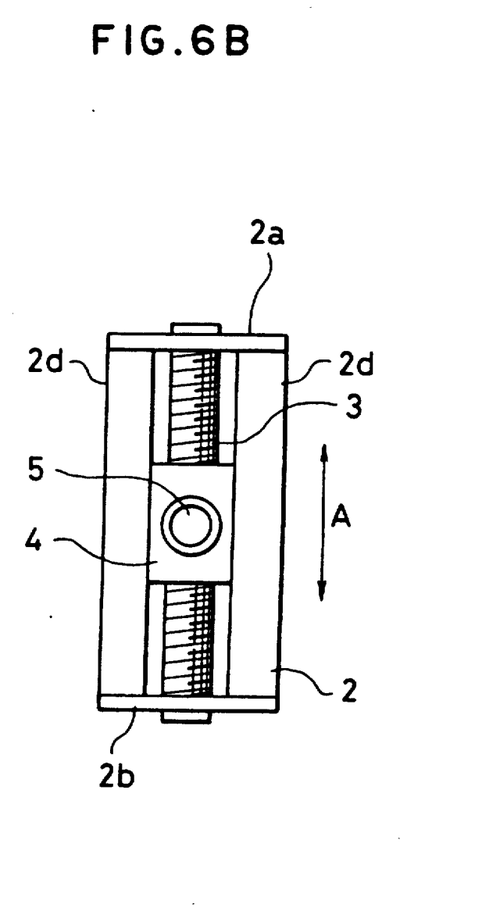
FIG. 6B is a side view thereof.
Figure 7:
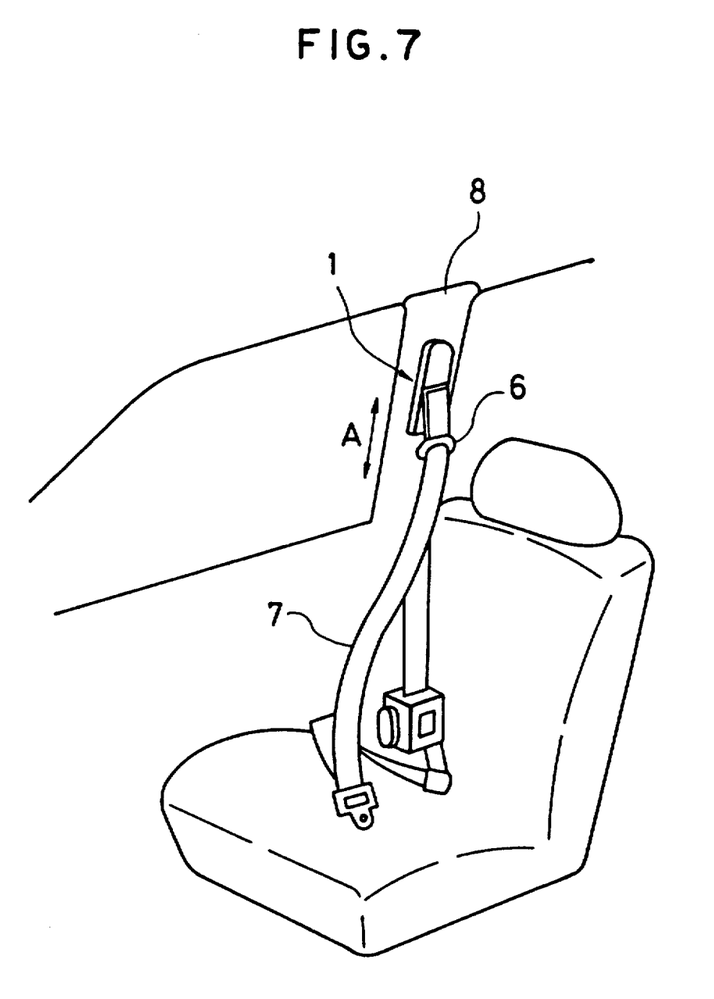
FIG. 7 is a view illustrating a mounting condition of a position adjusting device for a shoulder belt of a seat belt assembly in a vehicle body.

Such conventional position adjusting device for the shoulder belt of the seat belt assembly is illustrated in FIGS. 6A, 6B and 7.

Referring to these Figures, in the position adjusting device 1 for the shoulder belt of the seat belt assembly a mounting member 2 of a nearly U-shaped form is mounted on a center pillar 8 in an automobile. The mounting member 2 has opposite bent portions 2a and 2b, between which a screw shaft 3 is rotatably supported. An anchor support block 4 is so arranged that it may be guided by guide rails 2d and moved in a direction of an arrow A in the Figure by the rotation of the screw shaft 3. in FIG. 6, at 5 is indicated a mounting aperture for mounting a belt anchor 6 which loosely holds a shoulder belt 7 shown in FIG. 7.

In the position adjusting device 1 for the shoulder belt of the seat belt assembly having the structures described above, the anchor support block 4 has an internal thread surface fitted to an external thread surface of the screw shaft 3 so that the rotation of the screw shaft 3 may cause the anchor support block 4 to move along the guide rails 2d.

In the above position adjusting device for the shoulder belt, as the anchor support block 4 moves in accordance with the rotation of the screw shaft 3, a mechanical noise is generated due to the contact of the internal thread surface of the anchor support block 4 and the external thread surface of the screw shaft 3. That is; a fine space inevitably exists between the internal and external thread surfaces, which collide with each other to generate the operating noise when the anchor support block 4 moves. This noise may reduce comfortableness in the automobile, and may be misunderstood as a failure or trouble noise.

OBJECT AND SUMMARY OF THE INVENTION

An object of the invention is to provide a position adjusting device for a shoulder belt of a seat belt assembly, in which an anchor support member can move very quietly along a screw shaft, so that an operating noise can be significantly reduced during the position adjusting operation for the shoulder belt, which increases comfortableness inside a vehicle and prevents misunderstanding as a failure or trouble noise.

The present invention provides a position adjusting device for a shoulder belt of a seat belt assembly including an anchor support block adapted to be moved by rotation of a screw shaft, wherein the anchor support block includes two female screw members, which are biased toward or away from each other by an elastic member.

In the position adjusting device for the shoulder belt of the seat belt assembly according to the invention, an internal thread surface of the anchor support block is always pressed onto an external thread surface of the screw shaft by the elastic member.

Therefore, when the anchor support block moves in accordance with the rotation of the screw shaft, the collision of the internal and external thread surfaces is avoided, resulting in an extremely small mechanical noise.

BRIEF DESCRIPTION OF THE DRAWINGS

FIGS. 1E, 1F and 1G illustrate a position adjusting device for a shoulder belt of a seat belt assembly of an embodiment wherein.

DESCRIPTION OF THE PREFERRED EMBODIMENTS

Figures 1A, 1B:
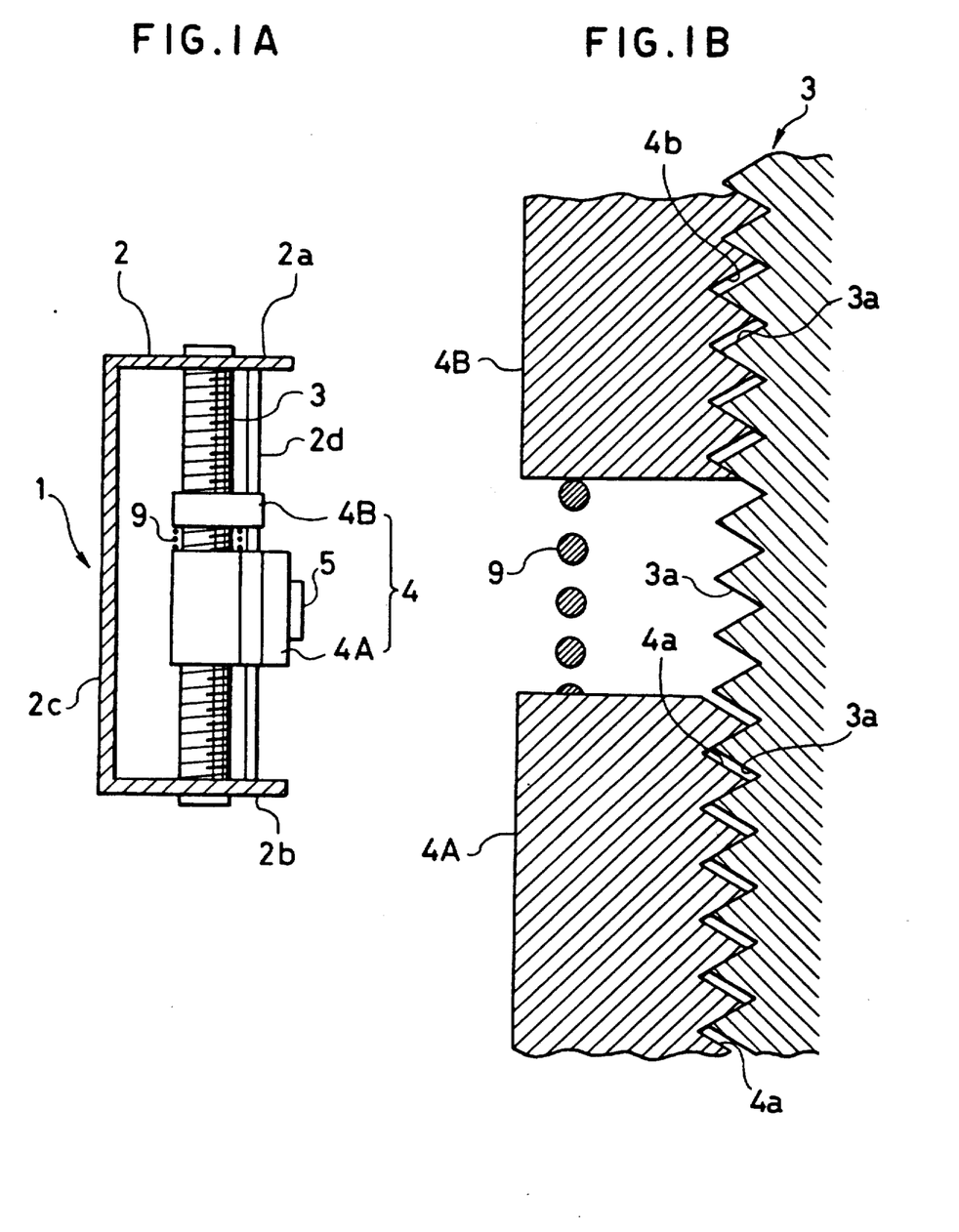
FIG. 1A is a sectional view of a device of an embodiment.
FIGS. 1B, 1C and 1D are fragmentary sectional views of a screw shaft and an anchor support member used in a device of another embodiment.

FIG. 1A is a sectional view of a position adjusting device for a shoulder belt of a seat belt assembly according to an embodiment of the invention, and FIG. 1B is an enlarged sectional view illustrating an engaged condition of a screw shaft 3 and an anchor support block 4 in the device.

In the illustrated embodiment, the anchor support block 4 includes a block body 4A and a nut member 4B. The block body 4A has an internal thread surface 4a meshing with an external thread surface 3a of the screw shaft 3. The nut member 4B has an internal thread surface 4b meshing with an external thread surface 3a of the screw shaft 3. These block body 4A and the nut member 4B are guided by a guide rail 2d. An elastic member 9 (i.e., a compression spring in the illustrated embodiment) is interposed between the block body 4A and the nut member 4B to bias the block body 4A and the nut member 4B away from each other. Thus, as shown in FIG. 1B, the internal thread surfaces 4a and 4b are always pressed onto the external thread surface 3a. Other structures are same as those in FIG. 6, and same portions bear same reference numbers.

Also in the position adjusting device 1 for the shoulder belt of the seat belt assembly constructed as above, the block body 4A and the nut member 4B are moved in synchronization with each other by the rotation of the screw shaft 3. In this operation, as shown in FIG. 1B, since the internal thread surfaces 4a and 4b are always pressed onto the external thread surface 3a, a collision noise is not generated between the external thread surface 3a and the internal thread surface 4a and between the external surface 3a and the internal thread surface 4b as the block body 4A and the nut member 4B move, so that they can move very quietly.

Figure 1C:
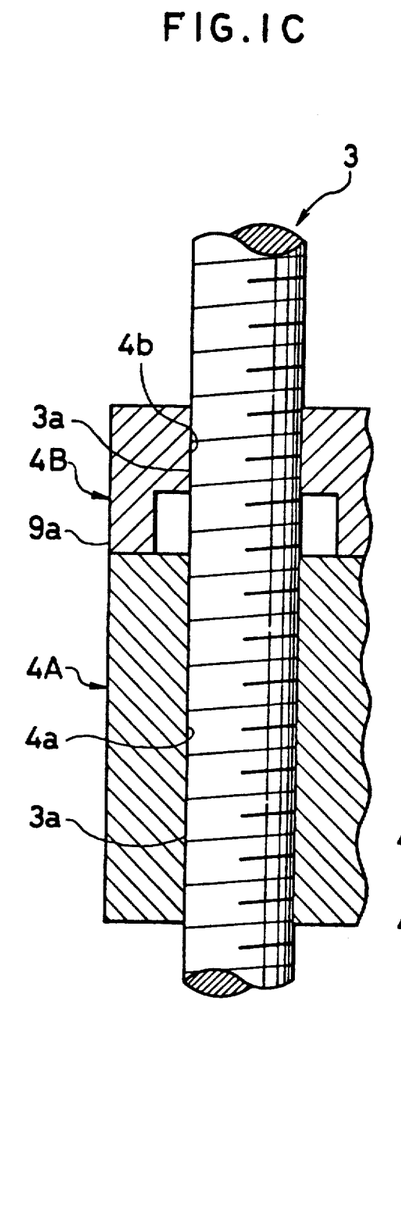

FIG. 1C is a fragmentary enlarged sectional view illustrating an embodiment in which an elastic member 9a is formed of synthetic resin. In this embodiment, the nut member 4B is formed of plastic resin and is integral with the elastic member 9a. The block member 4A and the nut member 4B can move very quietly also in this embodiment.

Figure 1D:
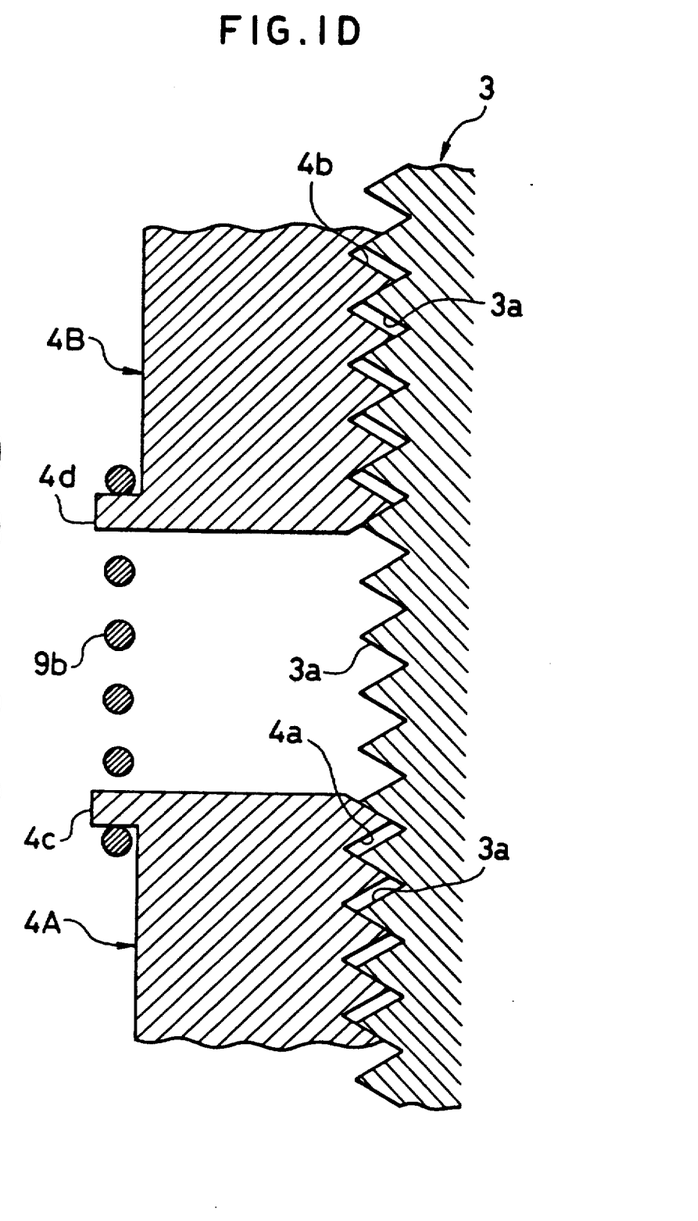

FIG. 1D is a fragmentary enlarged sectional view of an embodiment, in which an extension coil spring 9b is used as the elastic member to bias the block member 4A and the nut member 4B toward each other. Numbers 4c and 4d indicate spring engagement portions. The block member 4A and the nut member 4B can move very quietly also in this embodiment.

The above coil springs and synthetic resin are described merely as examples of the elastic member employed in the present invention, and other elastic members may also be used in the present invention. Of course, the present invention may be applied to various types of position adjusting devices for shoulder belts of seat belt assemblies other than that shown in FIGS. 6A, 6B and 7.

The invention may suitably applied to such a position adjusting device for a shoulder belt of a seat belt assembly as described hereinafter. This preferable position adjusting device for the shoulder belt in the seat belt assembly comprises a belt anchor into which the shoulder belt is loosely passed, an anchor support block supporting the belt anchor, a guide rail slidably holding the anchor support block, and a straight screw shaft which is arranged along a longitudinal direction of this guide rail and screwed into the above anchor support member, so that the anchor support block may be moved along the guide rail by the rotation of the screw shaft. In this device, an upper end of the screw shaft is suspended and supported by the guide rail. First, background on which such position adjusting device for the shoulder belt of the seat belt assembly has been developed will be described below.

Generally, a large force is applied to the shoulder belt in emergency such as collision of a vehicle(s). In the conventional device in FIGS. 6 and 7, this force is directly born by the screw shaft 3 through the anchor 6 and the anchor support block 4.

Therefore, in consideration of such force, the screw shaft having a large diameter and a high strength for bearing it has conventionally been used, which prevents the compact structure of the position adjusting device.

In the preferable form of the position adjusting device for the shoulder belt in the seat belt assembly, the upper end of the screw shaft is suspended and supported by the guide rail, so that a horizontal component (in directions X and Y) of the force applied to the belt anchor through the shoulder belt is born by the guide rail as a bending load against the guide rail, and that a vertical component (in the direction Z) thereof is born by the screw shaft as a tensile load against the screw shaft. Consequently, a mechanical strength of each member can set low, which allows a compact structure.

Since the bending load is not applied to the screw shaft, it will not be broken, resulting in increase of whole reliability of the device.

The preferable form will be described hereinafter with reference to the drawings.

Figures 1E, 1F:
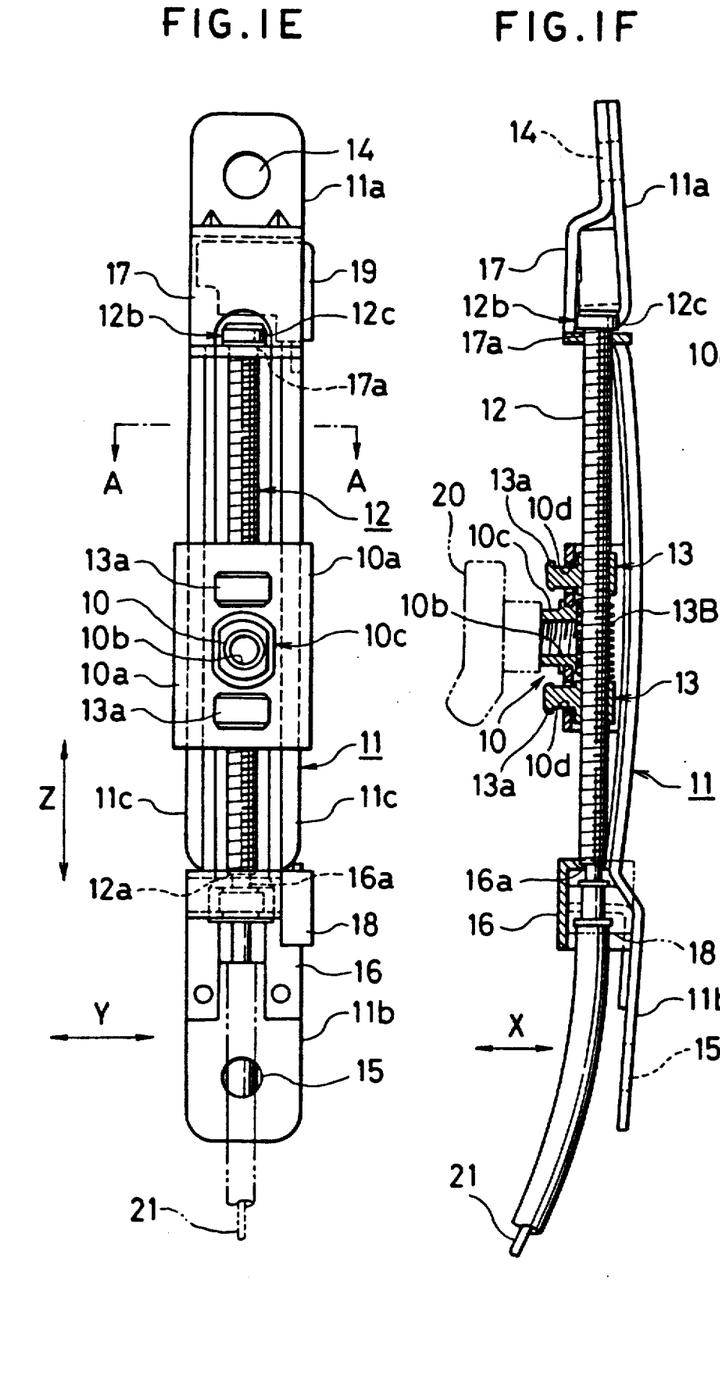
FIG. 1E is a plan view.
FIG. 1F is a partially cut-away front view and FIG. 1G is a sectional view taken along lines A—A.
Figure 1G:
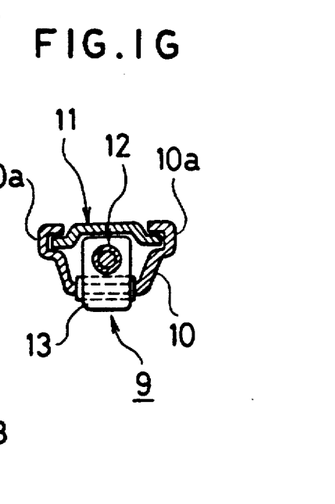

FIGS. 1E, 1F and 1G are a plan view, a partially cut-away front view and a sectional view taken along lines A—A, respectively, illustrating the position adjusting device for the shoulder belt of the seat belt assembly of this embodiment.

Referring to these Figures, the position adjusting device for the shoulder belt of the seat belt assembly comprises an anchor support member 10 (will be called as a "slider" hereinafter) supporting a belt anchor 20, a guide rail 11 slidably holding the slider 10, a screw shaft 12 which is rotatably attached to opposite ends of the guide rail 11 and is suspended at its upper end (in FIGS. 1E and 1F) by the guide rail 11, and movable members 13 as two female screw members, and a compression coil spring 13B as an elastic member interposed between the movable members 13. An anchor support block is formed by these movable members 13, slider 10 and spring 13B.

In the above structures, a component in the illustrated directions X and Y (i.e., horizontal component) of the force applied to the belt anchor 20 through the shoulder belt (not shown) is intended to be born by the guide rail 11, and the component in the illustrated direction Z (vertical component) is intended to be born by the screw shaft 12 through the slider 10. At 19 and 18 are indicated detection switches for detecting upper and lower end positions, respectively.

The guide rail 11 of this embodiment is curvedly formed along a center pillar of an automobile, and has the opposite ends 11a and 11b provided with bolt holes 14 and 15 for mounting it to the center pillar, respectively. Opposite side ends or edges between the opposite ends 11a and 11b form guide pieces 11c for slidably holding and guiding the slider 10. At vicinity of the opposite ends 11a and 11b, mounting members 16 and 17 are arranged for rotatably mounting the opposite ends of the screw shaft 12.

The above mounting member 16, which is employed to mount and support a lower end 12a of the screw shaft 12, has a nearly inverted U-shaped form in the front view, of which horizontal upper side is provided with an insert aperture 16a for inserting the lower end 12a of the screw shaft 12 into it. This mounting member 16 has a fragile structure which will be broken or deformed at a value smaller than the breakage strength of the screw shaft 12 so that deformation or breakage thereof may release the lower end 12a of the screw shaft 12.

The mounting member 17, which is employed to mount and support an upper end 12b of the screw shaft 12, has a strong structure and is provided with an aperture 17a for suspending and supporting the upper end 12b of the screw shaft. Further, contrary to the mounting member 16, the member 17 bears the component of the force in the illustrated direction Z applied to the screw shaft 12.

The above screw shaft 12 is arranged substantially parallel to the guide rail 11 between the mounting members 16 and 17, and is provided at the upper end 12b with a flange 12c to be suspended and supported in the aperture 17a. The lower end 12a is connected to a power transmission wire 21 for transmitting a driving force from a motor (not shown).

Figure 2A:
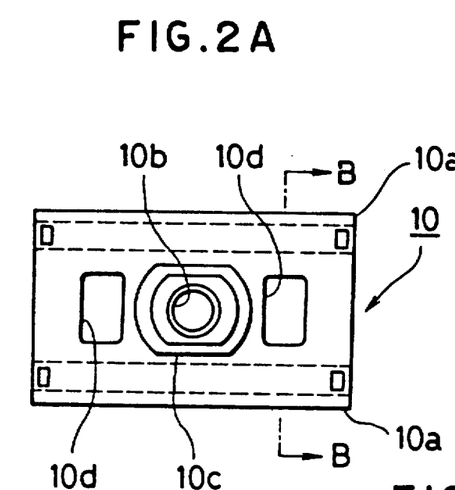
FIG. 2A is a plan view of a slider.
Figure 2B:
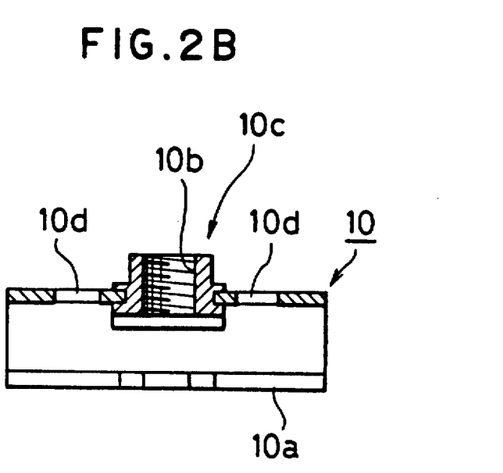
FIG. 2B is a sectional view of the same and FIG. 2C is an end view taken along lines B—B of the same.
Figure 2C:
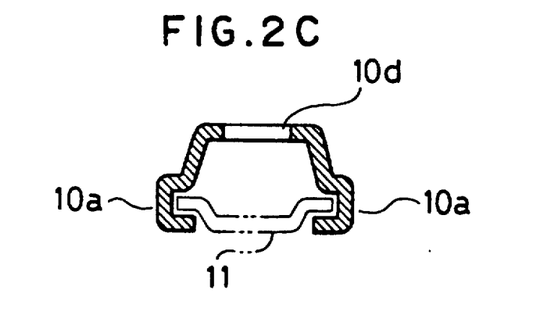

FIGS. 2A, 2B and 2C are a plan view, a sectional view and an end view taken along lines B—B of the slider 10, respectively.

The illustrated slider 10 has a nearly U-shaped section and is provided at opposite sides with engagement portions 10a into which the guide pieces 11c of the guide rail 11 are slidably engaged. The slider 10 is also provided at the illustrated upper surface with an anchor support portion 10c formed of a cylindrical column forming a concentrical internally threaded portion 10b for engaging the belt anchor 20, and square recesses 10d into which the projections 13a of the movable members 13, which will be described later, are loosely fitted.

Figure 3A:
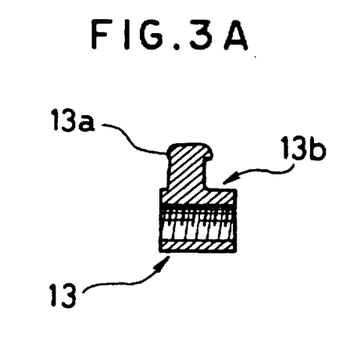
FIG. 3A is a longitudinally sectional view of a movable member.
Figure 3B:
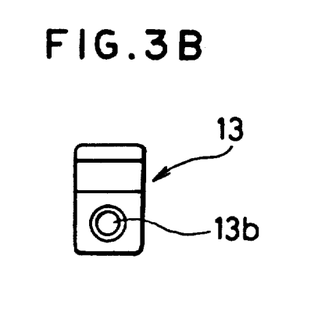
FIG. 3B is a side view thereof.

FIGS. 3A and 3B are a longitudinally sectional view and a side view of the movable member 13.

The illustrated member 13 has the projection 13a similar to a square column, which is loosely fitted in the recess 10d formed in the illustrated upper surface of the slider 10, and an internal threaded portion 13b engaging the above screw shaft 12. The movable member 13 is prevented from rotation by the projection 13a fitted into the recess 10d, so that it can be moved vertically along the guide rail 11 by the rotation of the screw shaft 12.

Since the recesses 10d and the projections 13a are loosely fitted to each other, when the movable members 13 move linearly along the screw shaft 12, the slider 10 can move along the curved guide rail 11.

Then, an operation of the position adjusting device for the shoulder belt of the seat belt assembly having the above structures will be described with reference to FIGS. 4A, 4B, 5B and others.

Figure 4A:
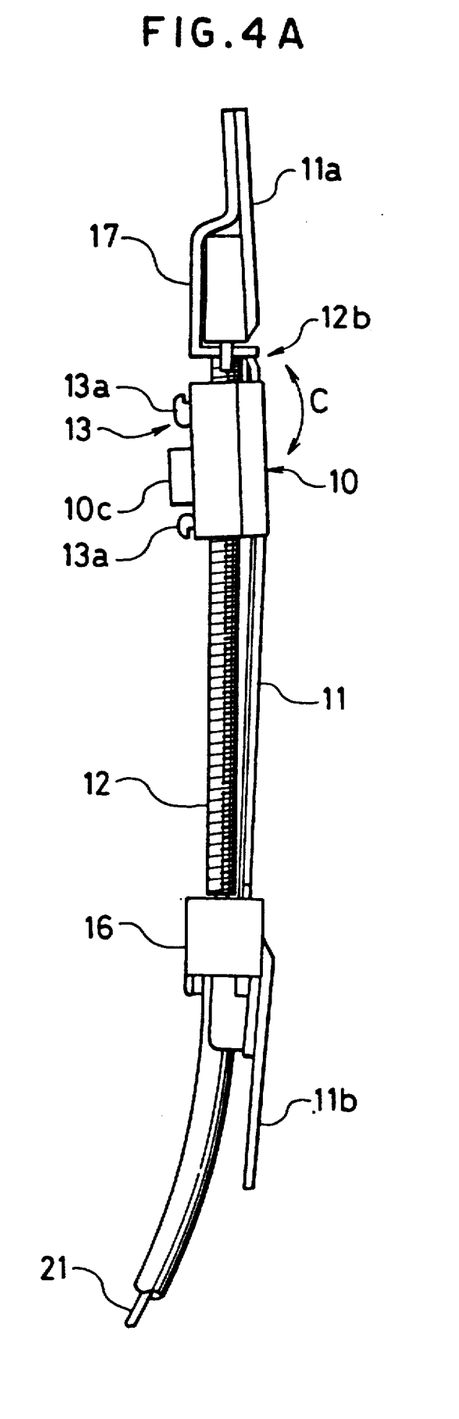
FIGS. 4A and 4B are views illustrating an operation of a slider and movable members.
Figure 4B:
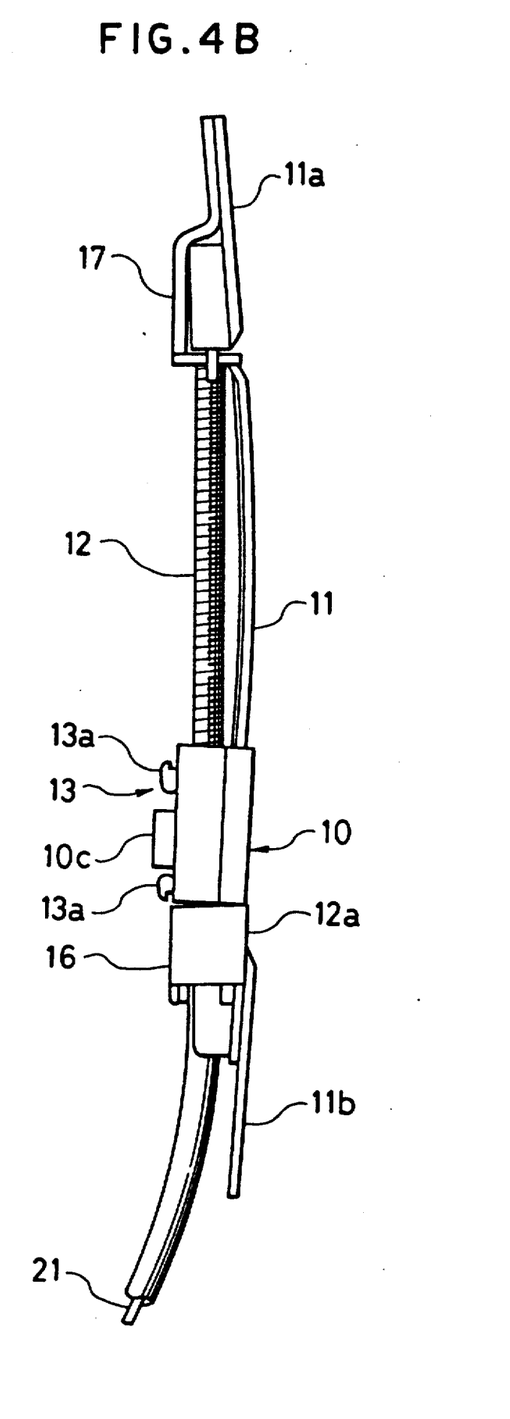

FIG. 4A illustrates a case in which the movable members 13 and the slider 10 are located at the side of the upper end 12b of the screw shaft 12. In this condition, when the unillustrated motor 10 drives through the transmission wire 21 the screw shaft 12 to rotate in a positive direction, the movable members are moved linearly along the screw shaft 12. At the same time, the slider 10 is moved together with the movable members 13 along the curved guide rail 11. When the screw shaft 12 is rotated reversely, the movable members 13 and the slider 10 move toward the upper end 12b in a similar manner. In this movement, since the projections 13a are loosely fitted into the recesses 10d, the slider 10 can freely move in the horizontal direction toward and away from the moving member 13, and can incline as indicated by an arrow C.

Figure 5:
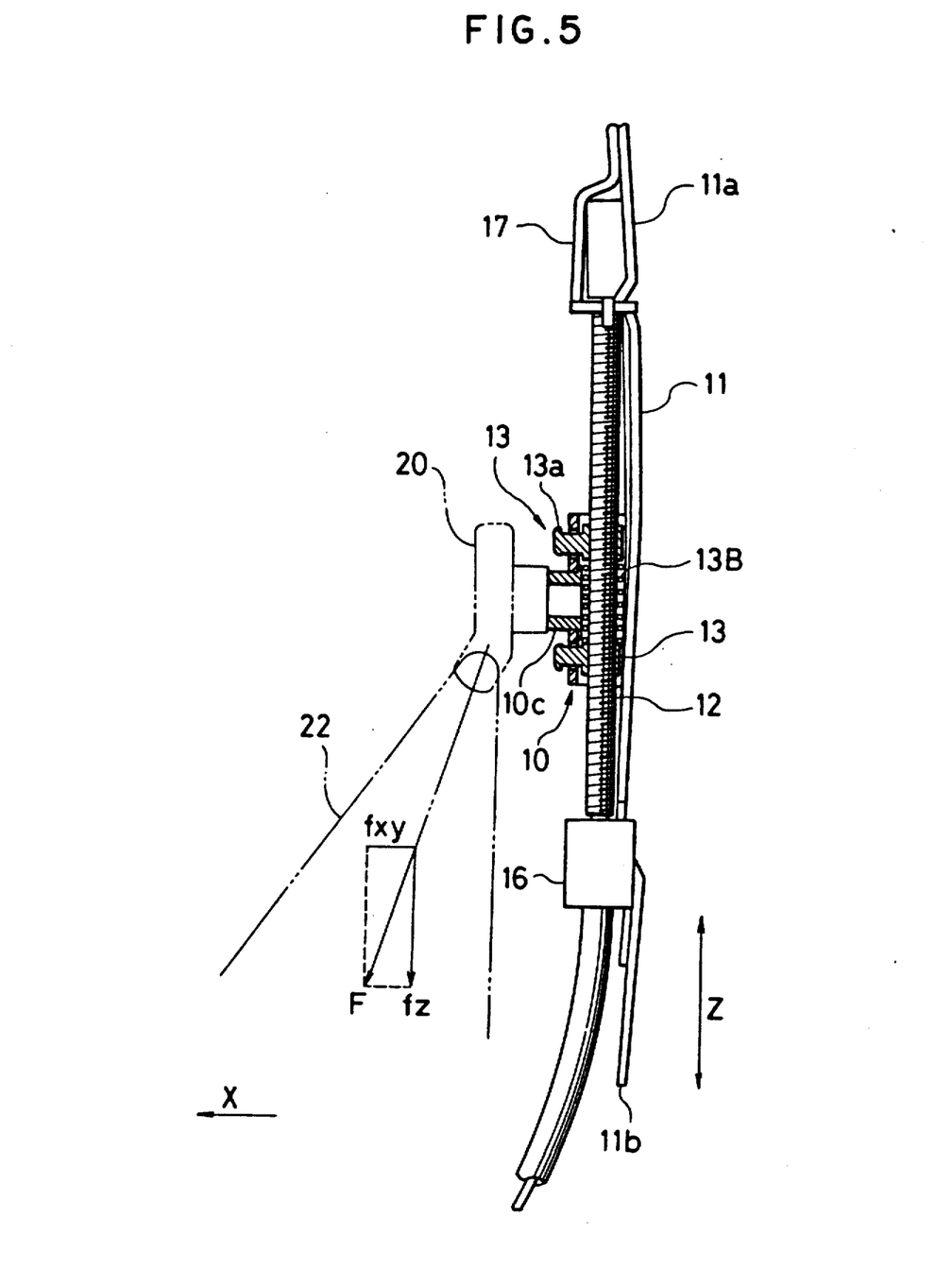
FIG. 5 is a view illustrating an action of a force applied by a shoulder belt.

An operation, in which the belt anchor 20 receives the force F through the shoulder belt 22 loosely connected to the belt anchor 20, will be described with reference to FIG. 5.

The force F is composed of a component $f_z$ in the direction Z (vertical direction) parallel to the screw shaft 12 and a component $f_{xy}$ in the directions X and Y (horizontal direction) perpendicular thereto.

The component $f_{xy}$ in the directions X and Y of the force applied to the shoulder belt 22 is born by the slider 10 and the guide rail 11. However, since the slider 10 is in loose engagement with the movable members 13, the component $f_{xy}$ in the directions X and Y is not applied to the movable members 13 and the screw shaft 12.

In the direction Z, since the slider 10 is merely engaged with the movable members 13, the component $f_z$ in the direction Z is not born by the slider 10 and the guide rail 11, and thus is born by the movable members 13 and the screw shaft 12 supported at the upper end 12b. Therefore, only a tensile stress is applied to the screw shaft 12 and a bending stress is not applied thereto. Consequently, the screw shaft 12 can have a diameter smaller than that of the conventional member without a possibility of breakage. Therefore, the whole device can be made compact.

When the component $f_{xy}$ in the directions X and Y increases to a value larger than a maximum allowable strength (plastic deformation strength) of the guide rail 11, the guide rail 11 curvedly deforms to a degree corresponding to the component $f_{xy}$ in the directions X and Y, and a bending force is applied to the screw shaft 12. In consideration of this, the mounting member 16 in the illustrated embodiment has so fragile structure that it may deform or break at a value smaller than the breakage strength of the screw shaft 12, and is constructed to release the lower end 12a of the screw shaft 12 when deformed or broken, so that the screw shaft 12 will not receive a bending force larger than the releasing force.

Further, in the embodiment, the guide rail 11 may be curvedly formed to extend closely along the center pillar, which also contributes to the compact structure.

Also in the position adjusting device constructed as above, in which the coil spring 13B biases the two movable members 13, i.e., the female screw members away from each other, the slider 10, i.e., the anchor support member, can be moved very quietly along the guide rail 11.

What is claimed is:

1. A position adjusting device for a shoulder belt in a seat belt assembly comprising,
   a belt anchor adapted to support a shoulder belt,
   an anchor support block for supporting the belt anchor and including two separate female screw members with female threads,
   a guide rail adapted to be fixed to a vehicle and slidably holding the anchor support block,
   a screw shaft extending along a longitudinal direction of said guide rail and having male threads, said male threads engaging the female threads of the female screw members of said anchor support member to have spaces therebetween so that the anchor support block may be moved along the guide rail by rotation of the screw shaft, and
   an elastic member situated between said two separate female screw members for biasing the female screw members with each other so that the female threads of the respective female screw members are pushed against the male threads of the screw shaft to closely abut against each other to thereby prevent noise by the space therebetween when the screw shaft is rotated.

2. A position adjusting device according to claim 1, wherein said anchor support block includes a block body having a mounting aperture for mounting the belt anchor for the shoulder belt, and a nut member located away from the block body, said elastic member being situated between the block body and the nut member.

3. A position adjusting device according to claim 1, wherein said anchor support block includes a slider engaging the guide rail, said slider being able to slide only along the guide rail, and two movable members engaging the screw shaft and forming the female screw members, said movable members engaging the slider to allow the slider to move only in a direction parallel to the guide rail, said elastic member being situated between the movable members.

4. A position adjusting device according to claim 3, wherein said slider includes two recesses, and the movable members include projections respectively, each projection being slidably situated in the recess.

5. A position adjusting device according to claim 4, wherein said slider includes an anchor support portion between the two recesses.

6. A position adjusting device according to claim 5, wherein said elastic member is a coil spring situated over the screw shaft and urging the movable members in the direction away from each other.

* * * * *